Patented Feb. 18, 1947

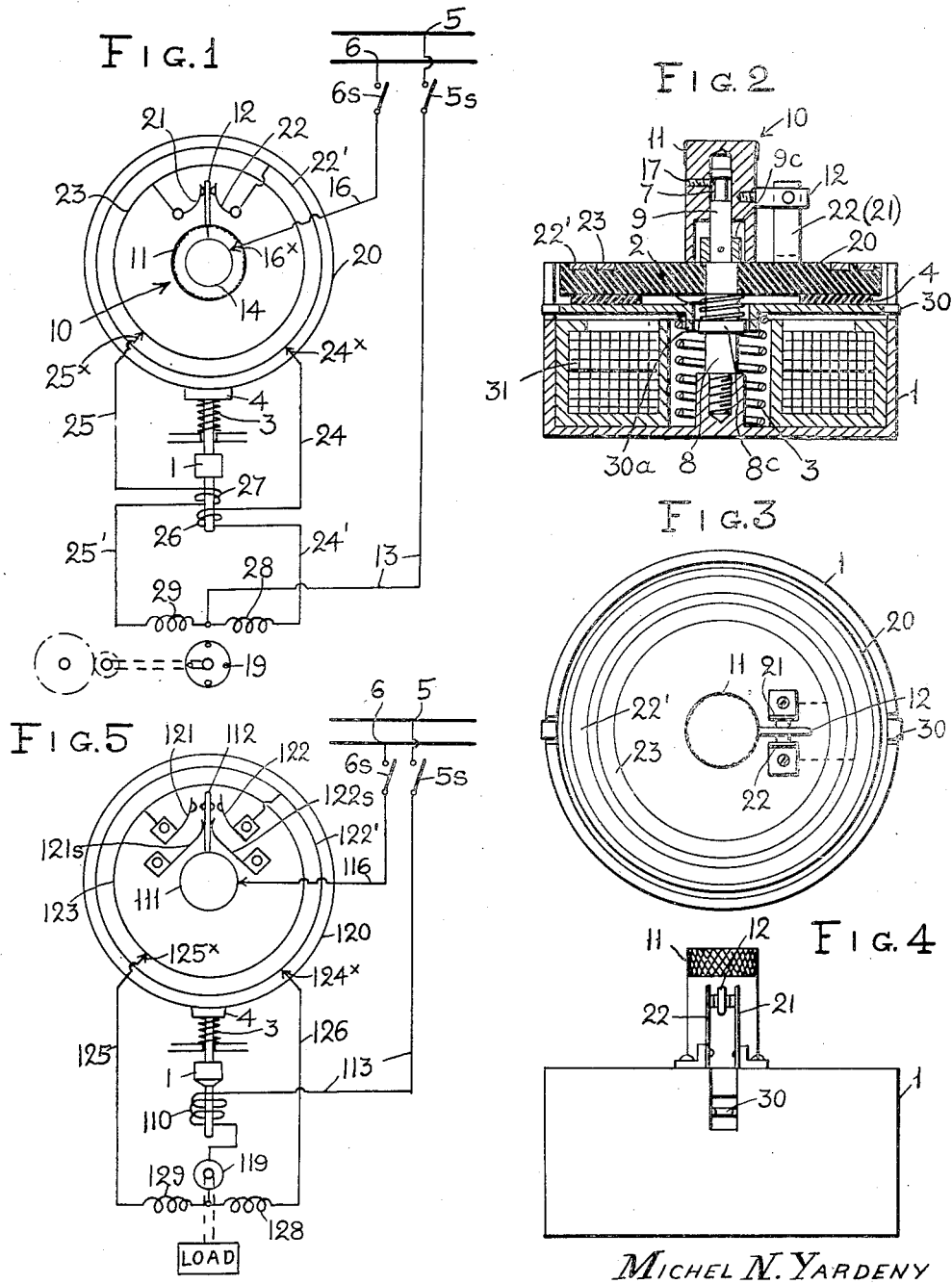

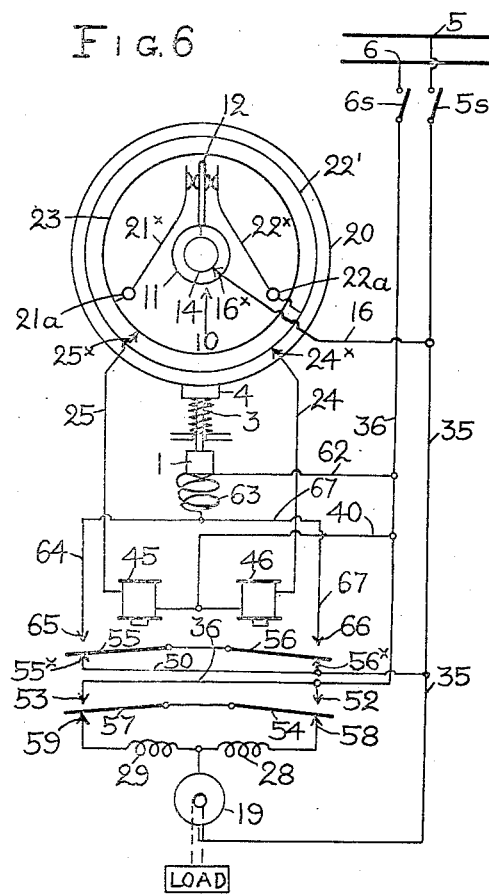
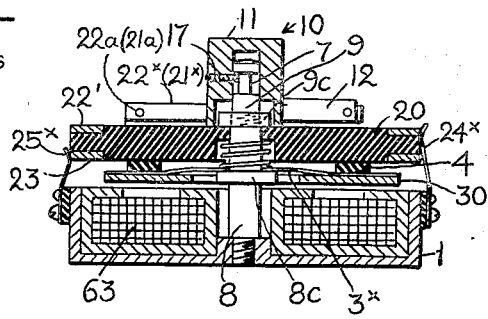
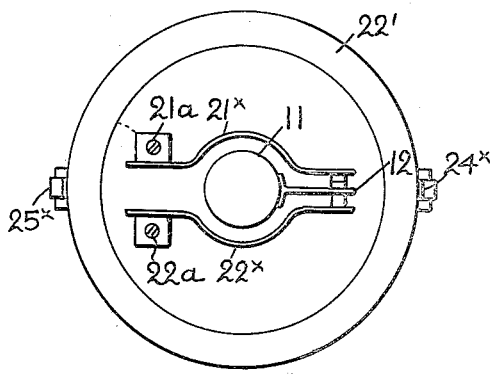
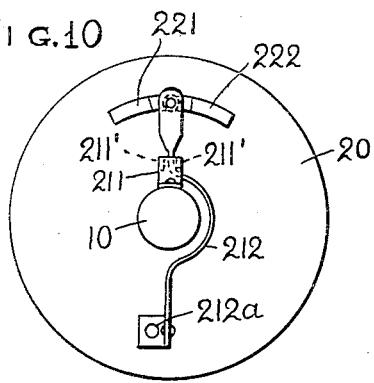
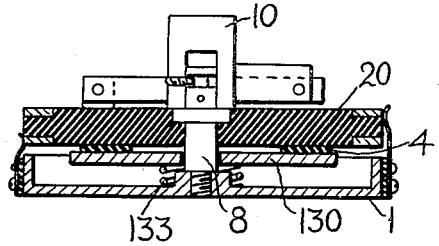
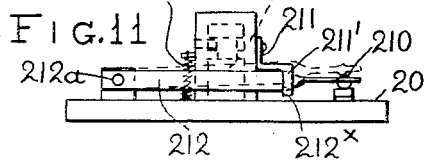
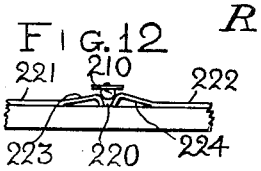

2,416,275

UNITED STATES PATENT OFFICE 2,416,275

ELECTRICAL IMPULSE TRANSMITTING DEVICE

Michel N. Yardeny and Robert Bernas, New York, N. Y.; said Bernas assignor to said Yardeny Application March 29, 1945, Serial No. 585,542

13 Claims. (Cl. 172—239)

1

This invention relates to electrical impulse transmitting devices, and more particularly, to an impulse transmitting device in which the characteristics of the impulse may be controlled by the nature of the manipulations imparted thereto.

The prime object of the invention is to provide an electrical impulse transmitting device in which impulses of predetermined characteristics may be transmitted depending upon the manner (fully described below in the specification of the invention) in which the manual or selective member of the device is manipulated. An allied object of invention is to provide an impulse transmitting device capable of transmitting broadly two different types of impulses, viz., "stepped impulses" and "timed impulses." By "stepped impulses" is meant impulses which depend upon the length of time that the manual or manipulative member is actuated, and in certain desired instances, also upon the rapidity with which the manual member is actuated; in the same or other instances, the "stepped impulses" may also be, if desired, varied by the vigor of the manipulation. The "stepped impulse" as thus defined is in contradistinction to the other type of impulses transmitted by the improved device, namely "timed impulses." By this is meant impulses which may be controlled as to the duration by the length of time that the operator maintains the manual or manipulative member in selected position.

The prime object of invention set forth above relates to the first type of impulse, namely, the "stepped impulses." A further allied object of the invention is to provide an improved transmitting instrumentality of the character described, which is adaptable at the will of the operator to transmit either the aforedefined "stepped" or "timed" impulses.

For the attainment of the foregoing and such other objects of invention as may appear or be pointed out herein, there are shown several embodiments of the invention in the accompanying drawings, wherein:

Fig. 1 is a diagrammatic illustration of the improved impulse transmitting device as applied to the control of the direction and extent of rotation of a reversible motor;

Fig. 2 is a sectional elevation of the improved impulse transmitter, per se;

Fig. 3 is a top view thereof;

Fig. 4 is a side view of the same;

Fig. 5 is a diagrammatic illustration of a modified form of a transmitting device as applied to the control of a reversible motor, differing from the form shown in Fig. 1 in that the contact fingers (more fully described in the following specification) are normally in disengaged position;

Fig. 6 is a diagrammatic illustration of the improved device similar to that shown in Fig. 1 except that Fig. 6 further shows the use of relays between the motor and the transmitting device;

Fig. 7 is a sectional elevation of the improved transmitter, per se, slightly modified as the arrangement of the contact elements, and also serves as a sectional view of Fig. 8;

Fig. 8 is a top view of the improved transmitter modified as to the arrangement of the contact elements;

Fig. 9 is a sectional elevation through a modified form of the improved transmitting device in which the electro-magnetic brake utilized in the form shown in the preceding figures is dispensed with and replaced by a frictional brake arrangement;

Fig. 10 is a top view of a modified form of a transmitting device according to this invention, in which different forms of contact elements are employed;

Fig. 11 is a side elevation thereof, and

Fig. 12 is a detail of the modified form of contact elements.

The improved transmitting device of this invention is shown in the accompanying drawings, for facility in illustration and description, as employed for the control of direction and extent of movement of a reversible motor. It is to be understood, however, that the improved transmitting device of this invention is by no means limited in its utility to the specific application illustrated and to be described hereinafter.

Referring first to the form shown in Figs. 1 to 4, the improved device of this invention comprises essentially two relatively movable members, one of which—designated generally as 10 in the figures referred to—is a manipulative contact member, which in the form best shown in Fig. 2, consists of a knob 11 which may be readily grasped between the fingers of one hand, for which purpose it is provided with a knurled surface as best shown in Fig. 4. Knob 11 is provided with a central core, in which is received a reduced end portion 9 of a post 8, which is secured to the housing 1 of the device, as best shown in Fig. 2; the knob is rotatable about the said post portion 9, and is prevented from being removed therefrom by means of a set screw or pin 17 which is received in an annular recess 7 in the post portion 9. Secured to knob 11 and extending radially outwardly therefrom is an electrical contact blade 12. The other member of the said pair of relatively movable members is a disc member 20 which is rotatably mounted about the said center post 8 and held between an upper collar 9c secured on the said reduced portion 9 and a collar 8c secured to or formed on the center post 8, a coil spring 2 being interposed between collar 8c and the underside of the disc member 20. The disc 20 is provided on its outer face with a pair of upstanding contact fingers 21 and 22, between which is interposed the aforesaid radially extending contact blade 12 of the manipulative contact member 10. Contact blades 21 and 22 are of a springy material, as shown—or may be provided with a separate spring—which tends to press the distal ends of the respective blades towards each other to hold the said radial contact blade 12 of the manipulative member 10 therebetween.

Underlying the disc member 20 is the armature, in the form of a disc 30, of an electro-magnetic brake, the coils of which, shown in Fig. 2 and designated generally as 31, have two oppositely wound coil components 26, 27, shown diagrammatically in Fig. 1. Armature disc 30 is mounted upon the central post 8 for a slight extent of axial movement and may be provided with guides at the edges for such movement, and is urged upwardly by a coil spring 3 interposed between the floor of the housing 1 and an annular shoulder 30a depending from the armature disc 30. Between the facing sides of the disc member 20 and the armature disc 30 is interposed a ring 4 of suitable friction material, such as fiber, "Bakelite," cork, etc.

The spring contact finger 21 is connected to a collector ring 23, see Fig. 1, engaged by a stationary brush 25x at one end of a lead 25, which is connected to one of the coils 27 of the aforedescribed electro-magnet. Coil 27 is connected by a lead 25' to the outer terminal of one of the reversing field windings 29 of a motor 19, shown as induction type motor. The other contact finger 22 of disc member 20 is connected to a collector ring 22', which is engaged by stationary brush 24x at one end of a lead 24, which is connected to the other coil 26 associated with the electro-magnetic brake; coil 26 is connected by a lead 24' with the outer terminal of the other reversing field winding 28 of motor 19. Radial contact blade 12 of the manipulative contact member 10 is connected to a collector ring 14 engageable by a stationary brush 16x provided at one end of the lead 16, which is connected through a switch 6s to one terminal 6 of a source of current supply. The other supply terminal 5 is connected through a switch 5s and a lead 13 to the inner terminals of the reversing field windings 28, 29. The electro-magnetic brake housing 1 is diagrammatically shown in Fig. 1 together with the friction or brake element and the coil spring 3, which maintains the friction element 4 in holding engagement with the disc member 20.

In the de-energized condition of electro-magnetic brake, the brake spring 3 maintains brake armature or disc 30 and frictional braking element 4 in holding engagement with the disc member 20. Hence, in the rest position of the device, the disc member 20 together with its contact fingers 21, 22 are held stationary with the radial contact blade 12 of the manipulative member 10 in a position engaging both spring contact fingers 21 and 22. In this normal condition of the parts, as shown in Fig. 1, the circuit is completed to both reversing field windings 28, 29 so that the motor 19 remains stationary, being held fixed by reason of the energization of both field windings. As mentioned before, the coil 27 (see Fig. 1) of the electro-magnetic brake, which is in the circuit connecting field winding 29 and collector ring 23, described above, is wound oppositely to the other coil 26 of the electro-magnetic brake, the latter being in the circuit connecting the other field winding 28 and the other collector ring 22'. Hence, when both field windings, and also both coils 26, 27 of the magnetic brake, are energized, in the normal rest position as mentioned above, the energization of the two opposing coils 26, 27 will neutralize each other so that the brake spring 3 is effective to maintain the disc member 20 in stationary position, as mentioned above.

If it is desired to rotate the motor in a selected direction, e. g., clockwise, manipulative contact member, 10, more particularly, its knob 11, is turned in the selected clockwise direction. By reason of the fact that the disc member 20 is maintained stationary by the spring of the electro-magnetic brake, as described above, clockwise manipulation of knob 11 will cause a tensioning of the anterior spring contact finger 22, and at the same time will cause disengagement between the other posterior contact finger 21 and the radial contact blade 12. It is thus seen that manipulation of the contact member 10 in a clockwise direction will maintain engagement between the radial contact blade 12 and the anterior contact finger 22, but will cause disengagement of the posterior contact finger 21 and radial blade 12. Hence, in the clockwise manipulation of the knob, the field winding 28, which is associated with contact finger 22, will continue to be energized while the other field winding 29, associated with contact finger 21, will be deenergized at the same time as the coil 27 of the electro-magnetic brake and associated with contact finger 21 will likewise become de-energized, leaving the other coil 26 in energized condition. In consequence of the de-energization of the field winding 29, in the example assumed, the motor will rotate in the selected clockwise direction, the energized field winding 28 being assumed to be effective to cause clockwise rotation. At the same time, the aforesaid de-energization of one of the coils of the electro-magnetic brake, more particularly coil 27, in the example assumed, will destroy the counter-balance condition of the electro-magnetic brake and cause the armature disc 30 of the brake to be attracted and withdrawn, against the urgency of brake spring 3, from holding engagement with the disc member 20. Release of the brake from the disc member 20 permits its turning, which, in the example assumed, will be in a clockwise direction by reason of the fact that the manipulative member 10 had been turned initially in that direction (and at the same time tensioning the anterior spring contact 22 of disc member 20); since the manipulative member 10 is maintained in its advanced position by the hand of the operator, its radial contact blade 12 serves to take up the reaction of the tensioned anterior spring 22, with the result that its energy is expanded in turning the now-freed disc member 20 in the same or clockwise direction. Clockwise rotation of disc member 20, however, causes its posterior contact finger 21 to re-engage the radial contact blade 12. Since contact between the radial blade 12 and the anterior contact finger 22 has in no time been lost (because of movement of the manipulative member in a clockwise direction, as described), the re-engagement of the posterior contact finger 21 with the radial blade 12—following the freeing of the disc member 20 from the electro-magnetic brake, as described—both field windings 29 and 28 are again energized to stop motor rotation by dynamic braking, as mentioned above.

The extent of motor rotation inaugurated by manipulation of the knob 11 in one direction or the other, as called for by the desired motor rotation, will depend upon the rapidity and vigor with which the knob is turned. For example, if the knob is moved very rapidly, it will cause a greater tensioning of the anterior spring contact (e. g., 22, if the knob is turned in a clockwise direction) and at the same time will cause wide separation or disengagement between the radial contact blade 12 and the posterior spring contact (21 in the example assumed). This will cause a greater extent of motor rotation for reason of the wide separation between the posterior spring contact and the radial contact blade; the effect of the greater tensioning of the anterior spring will be to increase the speed of turning of the disc member; while this increased speed of disc rotation tends to decrease the time before re-engagement is made between the posterior finger and the radial blade, it will, however, have less effect upon the time of motor rotation than will the fact, stressed above, that there is a greater separation between the posterior contact finger and the radial blade.

It should be noted that, if the manipulative member 10 is continued to be turned, the impulses will be repeated and will continue to be transmitted so long as the member is being turned. Such repeated or continued impulses result from the fact that the center radial contact blade 12 is moved away from the posterior contact finger 21, 22 to inaugurate a repeated impulse which is terminated when the posterior contact finger re-engages the radial contact blade.

If it is desired that the motor be rotated continuously and not in stepped impulses (as is the case described above, when the manipulative member is merely turned in the desired direction), the manipulative member—in addition to being turned in the desired direction—is also pressed downwardly, see best Fig. 2, to move the disc member 20 together with the armature 30 downwardly at the same time compressing brake spring 3 so that the disc member 20 is held stationary by the force of the compressed spring transmitted to it through the brake elements. The manipulative member is then moved (that is, while in the depressed condition) clockwise or counter-clockwise depending upon the desired load movement. Due to the depression of the disc member 20 and the armature 30, the latter cannot release the member 20 when attracted by the energized coil 26 or 27. The effect of holding the manipulative member together with the disc member 20 held in a stationary position is to prevent the turning of the disc member under urgency of the tension of the anterior spring contact (spring finger 22 in the example assumed, where the manipulative member is turned clockwise) and the re-engagement of the posterior contact (21, in the example assumed) with the radial contact blade 12. Hence, the motor will continue to rotate so long as the manipulative member is held depressed; upon releasing the same, disc member 20 is released, the armature 30 being attracted by the energized coil 26 or 27 and the tensioned anterior spring becomes effective to move the disc member in the direction in which the manipulative member had been turned, clockwise, in the example assumed, to cause re-engagement of the posterior contact finger and the radial contact blade and stopping of motor rotation.

To enable the manipulative member 10 to be depressed for the purposes described, the aforementioned annular groove 7 of the reduced portion 9 of the central post 8 is made sufficiently wide to permit the set screw or pin 17, secured to knob 11 as already described, to move downwardly upon applying pressure to the manipulative member.

In the form shown diagrammatically in Fig. 1, the spring contact fingers 21, 22 of the disc member 20 are shown normally in engagement with the radial contact blade 12 of the manipulative member 10. In the modified form shown diagrammatically in Fig. 5, the contact fingers, which are the counterparts of contact fingers 21, 22 of Fig. 1 and accordingly designated 121, 122 in Fig. 5, are shown normally disengaged from the central contact blade, which is designated 112 and extends radially from the manipulative member 110. Contact finger 121 is connected to collector ring 123 engaged by a stationary brush $125^x$ at one end of lead 125 connected to the outer terminal of field winding 129 of motor 119; the other contact finger 122 is connected to a collector ring 122′ engaged by stationary brush $126^x$ at one end of a lead 126 connected to the outer terminal of the other reversing field winding 128. It will be noted that the circuit of Fig. 5 differs from that of Fig. 1 in that the electro-magnetic brake has a single coil designated 110 in Fig. 5 and that this coil is in the armature circuit, more particularly in lead 113, connected through the coil 110 to the armature of motor 119. This arrangement differs from Fig. 1, in which it will be recalled that two coils are provided which are in the circuits to the respective field windings. The radially extending center contact blade 112 is connected to a collector ring 111 engaged by stationary brush $116^x$ at one end of a lead 116 connected to the other current supply switch 6s.

Since the contact fingers 121, 122 are normally disengaged from the radial contact blade 112, as shown in Fig. 5, auxiliary springs, which are designated 121s and 122s, are provided on opposite sides of the radial contact blade 112 to hold normally the blade in central position therebetween and in the gap separating the distal ends of the contact fingers 121, 122.

In the normal rest position, as shown in Fig. 5, both field windings 129, 128 are de-energized. The movement of the manipulative member 110 in one direction or the other, depending upon the selected load movement, causes engagement to be made with one or the other of the contact fingers 121, 122, to establish a circuit to the respective field windings 129, 128. For example, if the manipulative member is turned in a counter-clockwise direction, its radial blade 112 will engage contact finger 121 to energize the associated field winding 129 to cause motor rotation in a counter-clockwise direction. The turning of the manipulative member in that direction will cause a tensioning of the spring 121s, which functions in the manner described in Fig. 1 with reference to the corresponding spring contact fingers 21, 22. The engagement of the radial contact blade 112 of the manipulative member with one or the other of the contact member 121, 122 will establish a circuit through the coil 110 of the electromagnetic brake, which circuit may be readily traced from the inner terminal of the energized field winding (e. g., 129 in the example assumed), through the armature of the motor and through the coil 110, continuing via lead 113 to supply terminal 5.

The modification shown in Fig. 6 is similar to that shown in Fig. 1 insofar as the structure and operation of the improved transmitter is concerned, the parts thereof bearing identical reference characters to those used in describing the transmitter in Fig. 1, the difference between the two forms residing chiefly in the electrical connections between the transmitter and the motor 19 occasioned by the fact that in the system of Fig. 1 the collector rings of the transmitter are connected directly (except for the inter-position of the electro-magnetic coils 26, 27) to the reversing field windings 28, 29; whereas, in the system of Fig. 6 a pair of relays 45, 46 is provided between the motor windings 28, 29 and the collector rings 23, 22' of the transmitter. Relay 45 is associated with the collector ring 23, the outer terminal being connected thereto by lead 25; the other relay 46 is connected by lead 24 to the other collector ring 22'. It will be noted that the coils of the electro-magnetic brake are not included in leads 24, 25 but are connected to one of the relay contacts, as will be subsequently described.

The inner terminals of relays 45, 46 are connected by a lead 49 to a wire 36 leading through switch 6s to current supply terminal 6. Inner armature 55 associated with relay 45 normally engages a contact 55x, which is connected by a lead 50 to a wire 35 leading through switch 5s to the other supply terminal 5, and upon energization of the relay, engages a contact 65, which is connected by a lead 64 through coil 63 of the electro-magnetic brake 1, and via a second lead 62 to the aforementioned supply wire 36. The inner armature 56 associated with the relay 46 normally engages a contact 56x on the aforementioned lead 50; the inner armatures 56 and 55 are connected by a short lead, as shown. Upon energization of the relay 46, inner armature 56 engages a contact 66, which is connected by lead 67 connected to the aforementioned electro-magnetic coil 63. Outer armature 57 of relay 45 normally engages a contact 59 connected, as shown, to field winding 29; outer armature 54 of the other relay 46 normally engages a contact 58 connected, as shown, to the other field winding 28; the outer armatures 57 and 54 are connected together by a short lead, as shown, and upon energization of relay 45, outer armature 57 engages contact 53, which is at the terminal end of the aforementioned wire 36; upon energization of relay 46, its outer armature 54 engages contact 52, which is also on the aforementioned wire 36.

The system is shown in Fig. 6 in normal condition with the supply switches 5s—6s in open positions and with the contact fingers 21x, 22x of the disc member 20 in engagement with the center radial contact blade 12 of manipulative member 10. Upon closing the supply switches, the relays 45 and 46 are energized to attract their armatures into engagement with the upper contacts; the raising of both outer armatures 57, 54 breaks the circuit to the motor so that the motor remains stationary in the normal position of the parts as shown in Fig. 6 with both relays 45, 46 energized, as mentioned above; the raising of both their respective inner armatures 55, 56 breaks the circuit to coil 63 of the electromagnetic brake.

To cause a clockwise rotation of the motor, manipulative member 10 is turned in a clockwise direction to break the engagement between contact finger 21x and radial contact blade 12; as a consequence thereof, only the relay 46 remains energized, the circuit thereto being readily traced from supply wire 35, lead 16, brush 16x, collector ring 14, radial blade 12, contact finger 22x, collector ring 22', brush 24x, lead 24, to the relay 46, from whence to lead 49 to the other supply wire 36. Energization of relay 46, with the other relay 45 remaining in de-energized condition, completes a circuit to the field winding 29, which may be traced from supply wire 36 to relay contact 52, attracted outer armature 54 of energized relay 46, common lead between the outer armatures, unattracted armature 57 of de-energized relay 45, contact 59, field winding 29, through motor 19, and returning by supply wire 35 to the other supply terminal 5.

The said energization of relay 46 with the other relay 45 de-energized completes also a circuit to coil 63 of the electro-magnetic brake, which circuit may be traced from supply wire 35, lead 50, contact 55x, unattracted armature 55 of de-energized relay 45, common lead between the inner armatures, attracted armature 56 of energized relay 46, contact 66, and through lead 67 to electro-magnetic coil 63 and via lead 62 to the other supply wire 36. Energization of electro-magnetic coil 63 attracts the armature disc 30 (Fig. 7) of the electro-magnetic brake which, against the urgency of the compression spring 3, overcomes the effect of the latter and withdraws the friction brake element 4 from contact with the disc member 20 and thereby permits free rotation thereof.

Similarly, when the manipulative member 10 is turned in the counterclockwise direction to cause energization of the relay 45, the electro-magnetic coil 63 will be energized, which circuit may be readily traced in the manner followed above in connection with the energization of relay 46 except that the first part of the circuit starting with the supply wire 35 includes contact 56x, unattracted armature 56 to de-energized relay 46 and the attracted armature 55 of the energized relay 45, contact 65 and lead 64 connected to the electro-magnetic coil 63.

A modified form of contact arrangement is shown in Figs. 7 and 8, this arrangement being diagrammatically shown in Fig. 6 where the pair of contact fingers, which are the counterparts of contact fingers 21, 22 of Fig. 1, are designated, respectively, 21x and 22x. Whereas, in the modification diagrammatically shown in Fig. 1 and structurally shown in Fig. 2, the contact fingers are disposed in upright positions relative to the disc member 20, in the modification diagrammatically shown in Fig. 6 and structurally illustrated in Fig. 7, corresponding contact fingers 21x and 22x are disposed in a horizontal position overlying the disc member 20 and are pivoted at points, designated, respectively, 21a and 22a, near the edge of the disc so that a long leverage might be obtained from the distal ends which engage with the radial blade 12, as described above. In place of coil spring 3 shown in Fig. 2, a spring in the form of a tension disc designated 3x is employed in the modification of Fig. 7; disc spring 3x is anchored near its center to the central post 8 and is under a tension, which tends to raise the frictional element 4 in braking engagement with the underside of disc member 20.

A modified form of an improved transmitting device according to this invention is shown in Fig.

9 where the electro-magnetic brake is dispensed with and replaced by a frictional drag element which, as shown in Fig. 9, comprises merely a disc 133, which is rotatably mounted on central post 8. Interposed between the upper face of drag disc 130 and the underside of disc member 20 is the friction element 4; underlying the friction drag disc 130 and raised upon the floor of housing 1 is a coil spring 133, which is under initial compression to impart an upward force to the drag disc 130 so as to create frictional engagement between the friction element 4 and disc element 20.

We claim:

1. In a device for moving a load in either one of two directions, in combination, a motor for moving the load having a pair of reversing field windings, a pair of relatively movable members, one of the members having a single contact element and the other member having a pair of contact elements spring-pressed to maintain their distal ends in contact with the said single contact element of the first said member, one of the members being selectively movable in a direction depending upon the desired direction of load movement, electro-magnetic means including a brake element, a pair of coils and a spring normally urging the said brake element into holding engagement with the other of the said pair of relatively movable members, and circuit means connecting the said pair of reversing field windings with respective ones of the said pair of contact elements and with respective ones of the said pair of electro-magnetic coils, the said pair of electro-magnetic coils being oppositely wound and the said pair of contact elements being normally engaged with the said single contact element, whereby the said pair of reversing field windings is normally energized to hold the motor stationary by dynamic braking and whereby the said electro-magnetic means is de-magnetized to enable the said brake spring to hold the other of the said pair of members stationary.

2. In a device for moving a load in either one of two directions, in combination, drive means including a motor for moving the load, a pair of relatively movable members, one of the members having a single contact element and the other member having a pair of contact elements spring-pressed to maintain their distal ends in contact with the said single contact element of the first said member, one of the members being selectively movable in a direction depending upon the desired direction of load movement, electro-magnetic means including a brake element, a pair of coils and a spring normally urging the said brake element into holding engagement with the other of the said pair of relatively movable members, and circuit means including said motor, the said pair of contact elements and the said pair of electro-magnetic coils, the said pair of electro-magnetic coils being oppositely wound and the said pair of contact elements being normally engaged with the said single contact element, whereby the said circuit means is normally energized to hold the motor stationary by dynamic braking and whereby the said electro-magnetic means is de-magnetized to enable the said brake spring to hold the other of the said pair of members stationary.

3. In a device for moving a load in either one of two directions, in combination, drive means including a motor for moving the load, a pair of relatively movable members, one of the members having a single contact element and the other member having a pair of contact elements, spring means for maintaining the said single contact element centered between the said pair of contact elements, one of the members being selectively movable in a direction depending upon the desired direction of load movement, electro-magnetic means including a brake element, a coil and a spring normally urging the said brake element into holding engagement with the other of the said pair of relatively movable members, and circuit means including said motor, the said contact elements and the said electro-magnetic coil, the said electro-magnetic coil being normally deenergized and the said pair of contact elements being normally disengaged from the said single contact, element, whereby the said circuit means is normally de-energized to hold the motor stationary and whereby the said electro-magnetic means is de-magnetized to enable the said brake spring to hold the other of the said pair of members stationary.

4. In a device for transmitting electrical impulses, in combination, a pair of relatively movable members having cooperative contact elements normally spring urged into engagement with a predetermined tension therebetween, one of the members being selectively moved to increase the said tension between the contact elements, electro-magnetic means including a brake element, a pair of coils and a spring normally urging the said brake element into holding engagement with the other of the said pair of relatively movable members, and circuit means connecting the said pair of contact element with respective ones of the said pair of electro-magnetic coils, the said pair of electro-magnetic coils being oppositely wound and the said circuit means being normally energized whereby the said electro-magnetic means is demagnetized to enable the said brake spring to hold the other of the said pair of members stationary.

5. In a device for transmitting electrical impulses, in combination, a pair of relatively movable members having cooperative contact elements normally spring urged into a disengaged position, one of the members being selectively moved for effecting engagement between the said contact elements and to increase the spring tension in the direction of movement, electro-magnetic means including a brake element, a coil and a spring normally urging the said brake element into holding engagement with the other of said pair of relatively movable members, and circuit means including said contact elements and said electro-magnetic coil, whereby in the said normal position of the pair of contact elements the said electro-magnetic means is demagnetized to enable its said brake spring to hold the other of the said pair of members stationary.

6. In a device for moving a load in either one of two directions, in combination, drive means including a motor for moving the load, a pair of relatively movable members, one of the members having a single contact element and the other member having a pair of contact elements, spring means for maintaining the said single contact element centered between the said pair of contact elements, one of the members being selectively moved in a direction depending upon the desired direction of load movement, electro-magnetic means including a brake element, and a spring, circuit means including the said electro-magnetic means and the said contact elements, the said electro-magnetic means being normally energized, whereby the said electro-magnetic means is demagnetized in the normal rest position of the said pair of relatively movable members to enable its brake spring to hold the other of the said pair of members stationary.

7. In a device for moving a load in either one of two directions, in combination, drive means including a motor for moving the load, a pair of relatively movable members having cooperative contact elements, one of the members being selectively moved in a direction depending upon the desired direction of load movement, electro-magnetic means including a brake element, and a spring normally urging the said brake element into holding engagement with the other of the said pair of relatively movable members, and circuit means including said motor, said cooperative contact elements and the electro-magnetic means, said electro-magnetic means being normally demagnetized to enable its brake spring to hold the other of the said pair of members stationary.

8. In a device for transmitting electrical impulses, in combination, a manipulative member having a single contact element, a disc member having a pair of contact elements normally spring pressed under an initial predetermined tension into engagement with the said single contact element of the manipulative member, electro-magnetic means including a pair of coils, a brake element, and a spring, circuit means connecting said pair of contact elements with respective ones of the electro-magnetic coils, said coils being oppositely wound to render the said electro-magnetic means normally ineffective to overcome said brake spring whereby said spring normally holds the said disc member stationary, the manipulative member being movable in a predetermined direction to increase the tension between its said single contact element and the anterior one of the said pair of contact elements of the said stationarily-held disc member and to disengage its said single contact from the posterior contact element, said disengagement of the posterior contact element inaugurating a stepped impulse and breaking the circuit to the respective electro-magnetic coil to render the said electro-magnetic means effective to overcome its said brake spring and withdraw the said brake element from holding engagement with the said disc member, the said increased tension between the single contact element of the manipulative member and the anterior contact element of the said freed disc member causing the latter member to turn in the said predetermined direction to re-engage its posterior contact element with the said held single contact element of the manipulative member, and terminate the said stepped impulse.

9. In a device for transmitting electrical impulses, in combination, a manipulative member, a second member, said members being relatively movable and having cooperative contact elements under an initial predetermined tension, electromagnetic means including a brake element and a spring normally effective to engage the said brake element with the said second member, the manipulative member being movable in a predetermined direction to increase the tension between cooperative contact elements anteriorly of the direction of movement and to disengage the said cooperative contact elements posteriorly, said posterior disengagement of the cooperative contact elements inaugurating a stepped impulse and rendering the electro-magnetic means effective to overcome its said brake spring and withdraw the said brake element from holding engagement with the said second member, the said anteriorly increased tension of the cooperative contact elements causing the said freed second member to turn in the said predetermined direction to cause the said cooperative contact elements to re-engage and terminate the said stepped impulse.

10. In a device for transmitting electrical impulses, in combination, a manipulative member, a second member, said members being relatively movable and having cooperative contact elements having an initial predetermined tension, electromagnetic means including a brake element and a spring normally effective to engage the said brake element with the said second member, the manipulative member being movable in a predetermined direction to increase the tension between cooperative contact elements anteriorly of the direction of movement and to disengage the said cooperative contact elements posteriorly, said posterior disengagement of the cooperative contact elements inaugurating a stepped impulse and rendering the electro-magnetic means effective to overcome its said brake spring and withdraw the said brake element from holding engagement with the said second member, the said anteriorly increased tension of the cooperative contact elements causing the said freed second member to turn in the said predetermined direction to cause the said cooperative contact elements to re-engage and terminate the said stepped impulse.

11. In a device for transmitting electrical impulses, in combination, a manipulative member, a second member, said members being relatively movable and having cooperative contact elements under an initial predetermined tension, electromagnetic means including a brake element and a spring normally effective to engage the said brake element with the said second member, the manipulative member being movable in a predetermined direction to increase the tension between cooperative contact elements anteriorly of the direction of movement and to disengage the said cooperative contact elements posteriorly thereof, said posterior disengagement of the cooperative contact elements inaugurating a stepped impulse and rendering the electro-magnetic means effective to overcome its said brake spring and withdraw the said brake element from holding engagement with the said second member, the said anteriorly increased tension of the cooperative contact elements causing the said freed second member to turn in the said predetermined direction to cause the said cooperative contact elements to re-engage and terminate the said stepped impulse, said manipulative member being further movable in a direction to hold the said second member against movement, to retain the said increased anterior tension of the cooperative contact element and prevent the said posterior re-engagement thereof, whereby a timed impulse is transmitted for the duration of said holding movement.

12. In a device for transmitting electrical impulses, in combination, a manipulative member, a second member, said members being relatively movable and having cooperative contact elements, said cooperative elements being under an initial predetermined tension in their normal position, means for retaining the said second member against movement, the manipulative member being movable in a predetermined direction to vary the tension between the cooperative contact elements anteriorly of the direction of movement and to modify the said cooperative contact elements posteriorly from their said normal position, said posterior modification of the cooperative contact elements inaugurating a stepped impulse and rendering the said retaining means ineffective to hold the said member, the said anteriorly varied tension of the cooperative contact elements causing the freed second member to turn in the said predetermined direction to re-establish the cooperative contact elements to their said normal position and to terminate the said stepped impulse.

13. In a device for transmitting electrical impulses, in combination, a manipulative member, a second member, said members being relatively movable and having cooperative contact elements, said cooperative elements being an initial predetermined tension in their normal position, means for retaining the said second member against movement, the manipulative member being movable in a predetermined direction to vary the tension between the cooperative contact elements anteriorly of the direction of movement and to modify the said cooperative contact elements posteriorly from their said normal position, said posterior modification of the cooperative contact elements inaugurating a stepped impulse and rendering the said retaining means ineffective to hold the said second member, the said anteriorly varied tension of the cooperative contact elements causing the freed second member to turn in the said predetermined direction to re-establish the said cooperative contact elements to their said normal position and to terminate the said stepped impulse, said manipulative member being further movable in a direction to manually hold the said second member against movement, to retain the said varied anterior tension of the cooperative contact elements and to prevent their said posterior re-establishment to normal position, whereby a timed impulse is transmitted for the duration of said manual holding.

MICHEL N. YARDENY.
ROBERT BERNAS.

REFERENCES CITED

The following references are of record in the file of this patent:

UNITED STATES PATENTS

| Number | Name | Date |
| --- | --- | --- |
| 1,748,929 | Woodring | Feb. 5, 1930 |
| 999,947 | Barnum | Aug. 8, 1911 |